United States Patent
Soughan

[11] Patent Number: 5,932,260
[45] Date of Patent: Aug. 3, 1999

[54] COFFEE FLAVORING PACKAGE

[76] Inventor: John J. Soughan, 33 E. Orange St., Chagrin Falls, Ohio 44022

[21] Appl. No.: 09/195,413

[22] Filed: Nov. 19, 1998

Related U.S. Application Data

[63] Continuation-in-part of application No. 08/796,722, Mar. 3, 1997, abandoned.

[51] Int. Cl.⁶ .............................. B65B 29/02; A23F 5/00
[52] U.S. Cl. .............................. 426/78; 426/77; 426/420; 426/433; 210/506
[58] Field of Search ...................................... 426/417, 487, 426/488, 506, 77–79, 82, 84, 420, 433, 495; 210/506, 502.1, 777

[56] References Cited

U.S. PATENT DOCUMENTS

| | | |
|---|---|---|
| 2,330,884 | 10/1943 | Harriman . |
| 2,835,587 | 5/1958 | Maggiore . |
| 2,926,088 | 2/1960 | Spiselman . |
| 3,006,764 | 10/1961 | Stephenson et al. . |
| 3,126,284 | 3/1964 | Howerin . |
| 3,607,297 | 9/1971 | Fasano et al. . |
| 3,689,291 | 9/1972 | Draper . |
| 4,612,942 | 9/1986 | Dobberstein et al. . |
| 5,043,172 | 8/1991 | Loizzi . |
| 5,192,571 | 3/1993 | Levy . |
| 5,518,743 | 5/1996 | Pergola et al. . |
| 5,567,461 | 10/1996 | Lehrer . |

FOREIGN PATENT DOCUMENTS

| | | |
|---|---|---|
| 3612227 | 11/1986 | Germany . |
| 888351 | 1/1962 | United Kingdom . |

*Primary Examiner*—Anthony J. Weier
*Attorney, Agent, or Firm*—Pearne, Gordon, McCoy & Granger LLP

[57] ABSTRACT

A conventional coffee filter is replaced by a package containing a flavoring and in which a paper filter forms a wall. The filter-formed wall is the upstream wall of the package. When used in a conventional filter drip or automatic filter drip brewer, the result is a brewing system wherein the producing of a filtered filtrate of the coffee brew and the flavoring of the filtrate are performed as two separate and sequential steps.

6 Claims, 1 Drawing Sheet

5,932,260

COFFEE FLAVORING PACKAGE

RELATED APPLICATION

This application is a continuation-in-part of application Ser. No. 08/796,722 filed Mar. 3, 1997 now abandoned.

This invention relates to flavoring of coffee and particularly to a means and method for imparting flavoring to commercial ground coffee, regular or decaffeinated, by improved means and in an improved manner.

BACKGROUND OF THE INVENTION

"The background of the invention" as set out in Pergola et al. U.S. Pat. No. 5,518,743 is also applicable to the present invention and is incorporated by reference as if fully repeated herein, with the following exception: Such background discussion in Pergola et al. concludes with the statement that there is a need to provide the consumer with coffee of a variety of flavors through the use of a predetermined flavored filter. In light of the present invention, such need is better expressed as a need for a predetermined filtering package wherein both filtering and flavoring functions are performed, rather than expressing it as a need for a predetermined flavored filter as such.

BRIEF DESCRIPTION OF THE INVENTION

In the present invention, a conventional coffee filter is replaced by a filter-cum-flavoring package, by which is meant a package containing a flavoring and in which a paper filter forms a wall. The filter-formed wall is the upstream wall of the package. When used in a conventional filter drip or automatic filter drip brewer, the result is a brewing system wherein the producing of a filtered filtrate of the coffee brew and the flavoring of the filtrate are performed as two separate and sequential steps. An advantage of this sequence as compared to simultaneous filtering and flavoring is greater uniformity, efficiency and consistency in flavoring results.

DETAILED DESCRIPTION OF THE INVENTION

As mentioned above, in the present invention, a conventional coffee filter is replaced by a filter-cum-flavoring package by which is meant a package containing a flavoring and in which a paper filter forms a wall. The overall form of the package may be similar to that of a conventional coffee filter so that the package can replace a conventional filter in a brewing basket. The package may be of a shallow multiple-layered shape, with the top layer comprising a filter and the flavoring being carried in a layer separate from and below the top layer, or contained between the top layer and a lower layer.

The flavoring may be directly or indirectly supported on or in association with the inside or downstream face of the filter, provided that the filter is not clogged by the flavoring or by the indirect support for the flavoring. Direct support of the flavoring on the downstream side of the filter, although contemplated, may be difficult to accomplish without clogging of the filter paper. Indirect support of the flavoring on the filter may be by use of a layer of woven or unwoven fabric or scrim or large-pore paper or other support-web element fixed on or next to the underside or downstream side of the filter paper in supporting relationship with the flavoring and designed to allow the brewed coffee to complete its passage through the filter and form a filtered filtrate of the brewed coffee in an unimpeded manner. In particular, such layer or support web may consist of a second layer of filter paper, but one impregnated with flavoring agent as disclosed in Pergola et al. U.S. Pat. No. 5,518,743, the disclosure of which is incorporated by reference as if fully repeated herein. As disclosed in Pergola, the flavoring agent changes the flavor which would otherwise be imparted by what may be inexpensive coffee, and the flavoring agent thereby provides one of an assortment of flavors such as those listed in Pergola at column 7. The coffee's flavor in the absence of the flavoring agent may be referred to as the generic flavor. A changed coffee flavor resulting from the presence of a flavoring agent may be referred to as a custom flavor, and the flavoring agent as a custom flavoring.

Figure 1:
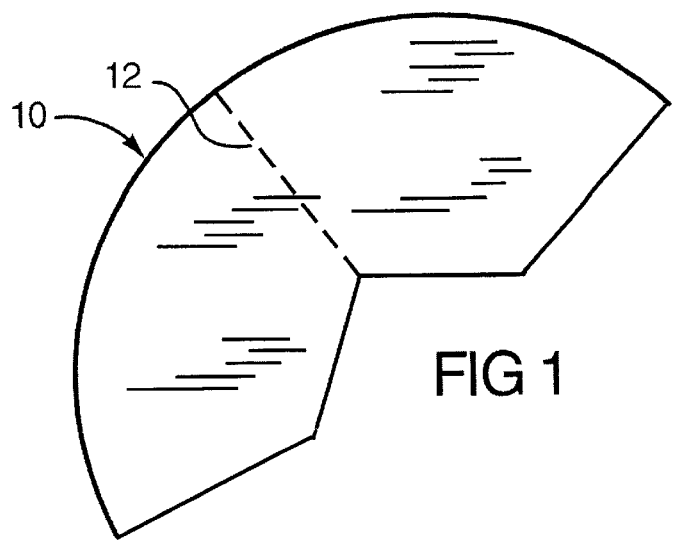
FIG. 1 is a plan view of a blank cut from a multilayered web and adapted to be formed into a filter-cum-flavoring package according to one example of the invention.

Instead of or in addition to supporting the custom flavoring directly or indirectly on or in association with the inside or downstream face of the filter of the filter-cum-flavoring package, or using the bottom wall or layer of the package to support or carry the flavoring, the flavoring may be contained between such two outer walls or layers of the package. For example, the flavoring in particulate form may be laid down on non-marginal portions of the bottom layer before the top layer (filter) and bottom layer are overlaid and joined, such joining (not shown) being only at or principally at the marginal portions of the layers (the portions of their areas that are adjacent to and extend along the entire perimeter of the blank into which such layers are die cut or otherwise cut to shape), such joining occurring either before or after the forming of the blank, so that when the layers are joined an internal chamber is formed between the top and bottom layers with the flavoring contained therein. The blank referred to may be similar in plan view to the blank 10 described below in connection with another embodiment of the invention and shown in FIG. 1.

The custom flavoring may be contained in a fibrous "insert" of the kinds disclosed in Loizzi U.S. Pat. No. 5,043,172, the disclosure of which is incorporated by reference as if fully repeated herein, such insert being contained within the filter-cum-flavoring package of the present invention so that such insert would be located on the downstream side of the filter, rather than upstream thereof as in Loizzi. Or, such "insert" might itself form the second (downstream) wall of the filter-cum-flavoring package. Such insert may be shaped similarly to the filter. It may be located immediately adjacent the downstream side of the filter so that the filter-cum-flavoring package consists of double-wall construction with no internal chamber or layer between the walls, with the filter on the upstream side and the "insert" on the downstream side of the package, or the "insert" may be spaced from the downstream side of the filter. The insert and the other layers may have one of the various shapes disclosed in Loizzi, or other shapes.

The custom flavoring may comprise flavoring solids or oils that may be encapsulated, granulated, powdered, or in gel form, and may be one of the flavoring agents disclosed in Loizzi or one of the preselected essential oils disclosed in Pergola et al., or any other suitable flavoring. The custom flavoring may be freeze-dried.

From a method standpoint, when coffee is brewed in a standard brewing machine using a filter-cum-flavoring package as above described in place of a conventional filter, coffee is brewed and flavored in the following steps: A filtered filtrate of a brew of the coffee is formed by brewing the coffee in a brew chamber and passing the coffee through a filter proper to produce filtered filtrate of the brewed coffee at the downstream side of the filter. A custom flavoring agent is then exposed to the filtered filtrate by flowing the filtrate past it at the downstream side of the filter to thereby add flavor associated with the flavoring agent to the filtered filtrate. Thus the steps of producing filtered filtrate and adding custom flavor to the filtered filtrate are substantially separate and sequential.

An advantage of this sequence as compared to simultaneous filtering and flavoring is greater uniformity and consistency in custom flavoring results. The amount of coffee solids removed by a filter proper can vary from locality to locality across the area of the paper itself, depending on variations in porosity of the paper, and depending also, or alternatively, on variations in density of solids content in different increments of the coffee brew volume (clumping) and consequent variations in the density of removed solids at various increments of the filter area. These conditions can result in substantial variance in rates of through-put of the brew at different local areas of the filter paper. When the same filter paper is impregnated with custom flavoring, such conditions tend to be exacerbated, and variations in local through-put can thin out or use up the custom flavoring at local areas of relatively high through-put, and to a degree cause fluid by-pass around areas of partially blocked or low through-put, whereby the high flow areas are starved for custom flavoring but produce a relatively high proportion of the total through-put, thereby underflavoring it to an extent. Because of these effects, the degree of custom flavoring can vary from brew to brew, thus undesirably making the custom flavoring results more uncertain than otherwise for any given brew. This effect can be avoided or minimized with the present invention, thus providing greater uniformity and consistency in custom flavoring results. Thus the present invention provides an improvement in the concept of modifying the generic flavoring of a brewed coffee to produce a preselected one of a variety of custom flavors. The consumer may purchase a relatively inexpensive generically flavored coffee and, using a filter-cum-flavoring package of the desired custom flavor in place of a conventional coffee filter when brewing that generically flavored coffee, may obtain custom-flavored coffee of the desired selection in a uniform and consistent manner. The invention contemplates that the filter-cum-flavoring packages of the invention may be sold in assorted collections or in collections of the same custom flavor, and that such collections themselves may be packaged along with a relatively inexpensive generically flavored coffee. An alternative is to package and sell such assorted or uniform collections separately from any generic coffee, allowing the consumer to use them with any generically flavored coffee available to the consumer.

Such improvement in uniformity and consistency of custom flavoring results can be enhanced in many instances by providing the filter-cum-flavoring package of the invention with an to internal diffusing space, thus allowing the varying throughputs of filtered filtrate passing from the filter proper at different local areas to diffuse to a greater or lesser degree before the custom flavoring is exposed to the filtrate, thereby in turn providing a more even distribution of throughput rates at the incoming side of the layer in which the custom flavoring is exposed to the filtrate.

Figure 2:
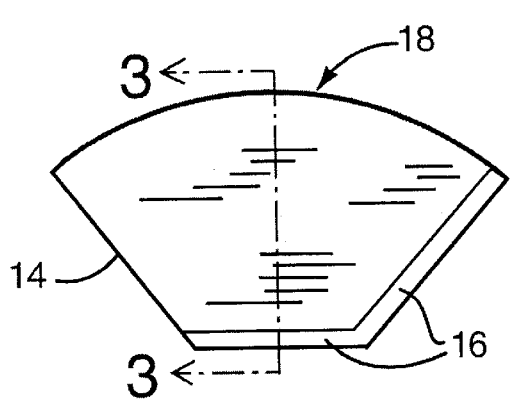
FIG. 2 is a filter-bag-shaped package formed and constructed by folding and marginally fastening the blank of FIG. 1.
Figure 3:
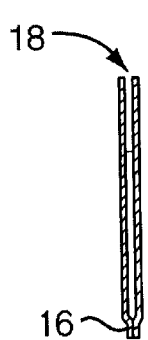
FIG. 3 is a cross-section taken on line 3—3 of FIG. 2, and on the same scale as FIGS. 1 and 2, such scale being too small a scale to show the individual layers of the package.
Figure 4:
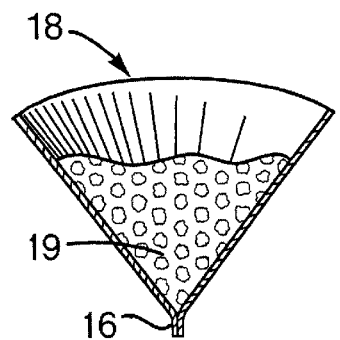
FIG. 4 is on the same scale as FIGS. 1–3, and shows the package of FIG. 3 after its mouth has been spread open for receiving coffee grounds when or after the package is placed in the brew basket of a conventional manual or automatic filter drip machine.

In the particular example of the invention shown in the drawing, a filter-cum-flavoring package is provided in three-layer form, Web stock comprising all three layers is cut into a blank 10 formed similarly to a conventional paper web used in a filter drip brewer. This form is then folded around fold line 12 to form the corresponding closed edge 14 in FIG. 2. The side edges other than the rim are then joined by interlocking embossments or the like in fastening zones 16 in the manner of conventional paper filters to complete formation of the filter-cum-flavoring package 18 as seen in FIGS. 2 and 3, much as a conventional piece of filter paper is formed so that when the package 18 is expanded or opened to receive ground coffee 19, as seen in FIG. 4, the filter is then shaped to be more or less congruently received in a brew basket.

Figure 5:
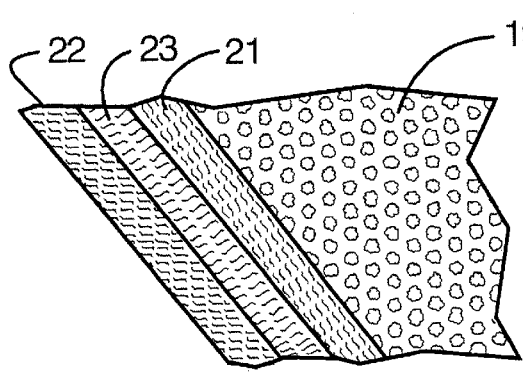
FIG. 5 is a fragmentary cross-sectional view of portions of a lower part of FIG. 5 on an enlarged scale, and showing the three layers of which the filter-cum-flavoring package in the illustrated example of the invention consists.
Figure 5:
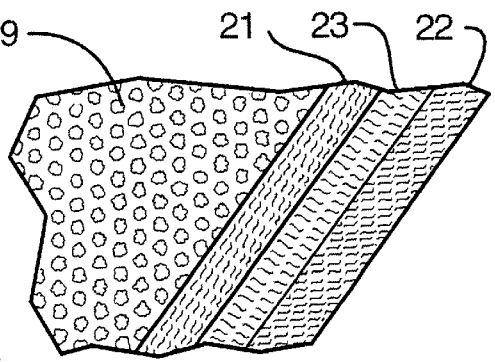

In the particular package shown in the drawings, a third, diffusing layer is provided in addition to a filter paper layer and a custom-flavor-carrying layer. The three separate layers 21, 22 and 23 of this package are seen in FIG. 5. The top layer 21 comprises the filter paper proper. The bottom flavor-carrying layer 22 may comprise a second web of filter paper impregnated to with a flavoring agent, such as described in Pergola et al., but located below or downstream of the filter proper 21 in the present invention. Or, the custom-flavor-carrying layer 22 may comprise a fibrous "insert" of the kinds disclosed in Loizzi, such insert being located on the downstream side of the filter, rather than upstream thereof as in Loizzi. The fibrous material of the insert is selected to be sufficiently flexible to allow folding of the blank 10 into the filter-cum-flavoring package 18. The layer 22 preferably has a greater porosity than the filter paper layer 21.

Another advantage of the invention is that, unlike prior systems such as Pergola, it avoids any reliance on the layer that is doing the filtering to also add the custom flavoring. Custom flavoring in the form of coffee oils or essences can be absorbed by the fibers of the paper filter—a blotting effect that can degrade the flavoring action. On the other hand, as with the present invention, when the filter itself is not relied on to carry the custom flavoring, but another layer below the filter does so, such other layer, such as the layer 22 in the particular example illustrated, can be selected to be non-absorbent of or less absorbent of coffee oils and essences or other custom flavorings than the filter layer would be (the filter layer 21 in the particular example illustrated), thus eliminating or minimizing the blotting effect referred to. This further contributes to uniformity and consistency in flavoring results achieved by the invention.

In the illustrated example, the middle or third layer 23 is provided in the form of a mesh, woven or unwoven fabric, paper or scrim to provide a diffusion space or zone for the filtered but not yet custom flavored filtrate leaving the inner side of the filter paper layer 21, thereby improving uniformity and consistency in custom flavoring results, as previously mentioned. The openness or porosity of this diffusion layer 23 is preferably very high as compared to that of the flavor-carrying layer 22, which in turn is preferably higher than that of the layer 21 of filter paper proper.

As stated earlier above, the custom flavoring in particulate form may be laid down or sprayed or otherwise deposited on non-marginal portions of the bottom layer (e.g., layer 22) on the upstream side of such layer and before the top layer (e.g., filter 21) and bottom layer are overlaid and joined, such joining being only or principally at their then-existing or then-about-to-exist marginal portions either by interlocking embossments, adhesive, or other known means, and such joining at marginal portions occurring either before or after such layers are die cut or otherwise cut to shape, so that when the layers are joined an internal chamber is formed between the top and bottom layers with the flavoring contained therein. Such internal chamber can be visualized as a flavoring-containing interval of thickness entirely replacing the layer 23 illustrated in FIG. 5, or merging into or permeating the illustrated layer 23. If the layer 23 is omitted to be replaced in its entirety by a flavoring-containing interval of thickness, the measure of such flavoring-containing interval of thickness may be zero where marginal portions of the top and bottom layers are joined directly to each other, but will have small positive values, say fractions of a millimeter, in many other regions, and may tend to be largest in regions associated with what becomes the bottomward portion of the filter-cum-flavoring package when it is deployed in a brew basket, reflecting a tendency of the particulate flavoring to settle towards the bottom of the deployed package.

Instead of being deposited on the upstream side of the bottom layer, the flavoring may be deposited on non-marginal portions of the downstream side of the top (or filter) layer before the top and bottom layers are overlaid and joined.

In cases where the custom flavoring is impregnated into or otherwise affixed in or on a supporting layer, settling of the flavoring toward the bottom of the deployed filter-cum-flavoring package may not occur.

Implicit in the foregoing is that the top and bottom layers of the filter-cum-flavoring package each extend throughout a continuous area and are permeable and free of pockets or interruptions throughout such area, similarly to the conventional paper filters which the filter-cum-flavoring packages of the present invention replace.

From a method aspect, the invention may not use the filter-cum flavoring package described above but may instead perform the method by inserting a custom-flavor-impregnated paper such as shown in Pergola et al. or an insert such as shown in Loizzi, or similar flavor carrier layer, immediately below or on the downstream side of a fine-mesh, permanent-type, metal or to plastic filter or the like, or preferably in slightly spaced relationship therewith to provide a diffusing space between the permanent-type filter and the carrier for the custom flavoring.

This disclosure is by way of example, and various changes may be made by adding, modifying or eliminating details without departing from the fair scope of the teaching contained in this disclosure. The invention therefore is not limited to particular details of this disclosure except to the extent that the following claims are necessarily so limited.

What is claimed is:

1. A multilayer filter-cum-flavoring package formed from a multilayer blank of web material and shaped for reception in a filter-receiving brew basket and for receiving on the outer top side of said web material a charge of coffee for brewing in said brew basket, said multilayer package comprising at least a pair of permeable layers of web material, each of said layers extending throughout a continuous area and being permeable throughout said area, a first of said at least a pair of permeable layers being the top layer of said pair and comprising a layer of filter paper adapted to support said charge of coffee on its top side and to produce on its downstream side a filtrate of brewed coffee when said charge of coffee is brewing in said brew basket, a second of said at least a pair of permeable layers being more porous than said first layer and being located on the downstream side of said first layer to constitute the lower layer of said pair, and custom flavoring contained within said package downstream of said first layer for custom flavoring said filtrate of brewed coffee which has been produced on the downstream side of said first layer.

2. A package as set forth in claim 1, said second permeable layer being impregnated with said custom flavoring.

3. A package as set forth in claim 1, said second permeable layer forming a container wall for said custom flavoring.

4. A package as set forth in claim 2, said pair of permeable layers of web material being separated by a third layer of web material for defining a diffusion spacer between said pair of layers to improve diffusion of filtrate before it reaches said second of said pair of layers and the custom flavoring impregnated therein.

5. A package as set forth in claim 3, a third layer of web material between said first layer and said custom flavoring to improve diffusion of filtrate before it reaches said custom flavoring, said custom flavoring being contained by said container wall formed by said second layer of web material.

6. A package as set forth in claim 3, said first and second layers being joined at their marginal portions and said custom flavoring being contained between said layers at non-marginal portions thereof.

\* \* \* \* \*